United States Patent [19]

Reinhard et al.

[11] Patent Number: 4,517,926
[45] Date of Patent: May 21, 1985

[54] DEVICE FOR IMPROVING FUEL EFFICIENCY AND METHOD OF USE THEREFOR

[75] Inventors: George G. Reinhard, Warren; Ronald Kinde, Mt. Clemens, both of Mich.; Bernard S. Singer, Haifa, Israel

[73] Assignee: Optimizer, Limited, Flint, Mich.

[21] Appl. No.: 369,618

[22] Filed: Apr. 19, 1982

[51] Int. Cl.³ ............................................. F02M 31/00
[52] U.S. Cl. ......................................... 123/3; 44/50; 123/557
[58] Field of Search ............... 123/3, 557, 549; 44/50, 44/68, 57

[56] References Cited

U.S. PATENT DOCUMENTS

| | | | |
|---|---|---|---|
| 904,203 | 11/1908 | Hertzberg | 123/557 |
| 1,065,580 | 6/1913 | Bzucus | 123/549 |
| 1,237,862 | 8/1917 | Bintliff | 123/557 |
| 1,717,767 | 6/1929 | Diaz | 123/3 |
| 3,635,200 | 1/1972 | Rundell | 123/3 |
| 3,653,364 | 4/1972 | Bogan | 123/3 |
| 4,086,893 | 5/1978 | Bernecker | 123/557 |
| 4,180,385 | 12/1979 | Chikul | 44/68 |

FOREIGN PATENT DOCUMENTS 372383 5/1932 United Kingdom ................ 123/3

Primary Examiner—Ronald H. Lazarus
Attorney, Agent, or Firm—Basile, Weintraub & Hanlon

[57] ABSTRACT

A device for increasing the fuel efficiency in an internal combustion engine having a fuel supply conduit connecting a fuel supply and a carburetor, a hollow housing disposed in fluid communication with the fluid supply conduit between the fuel supply and the carburetor or firing chambers. A heat source, such as a heating element is mounted within the tubular member for heating the fuel flowing through the hollow housing. While flowing through the housing, the fuel is in intimate contact with metallized pellets of a metal, such as a noble metal deposited on a substrate. The pellets are disposed within the housing. In an alternate embodiment, hereof, two types of catalyst are disposed within the housing, one richer in metal content than the other. In practicing the present invention, the fuel passes through the housing and issues therefrom at a temperature less than 100° C.

10 Claims, 3 Drawing Figures

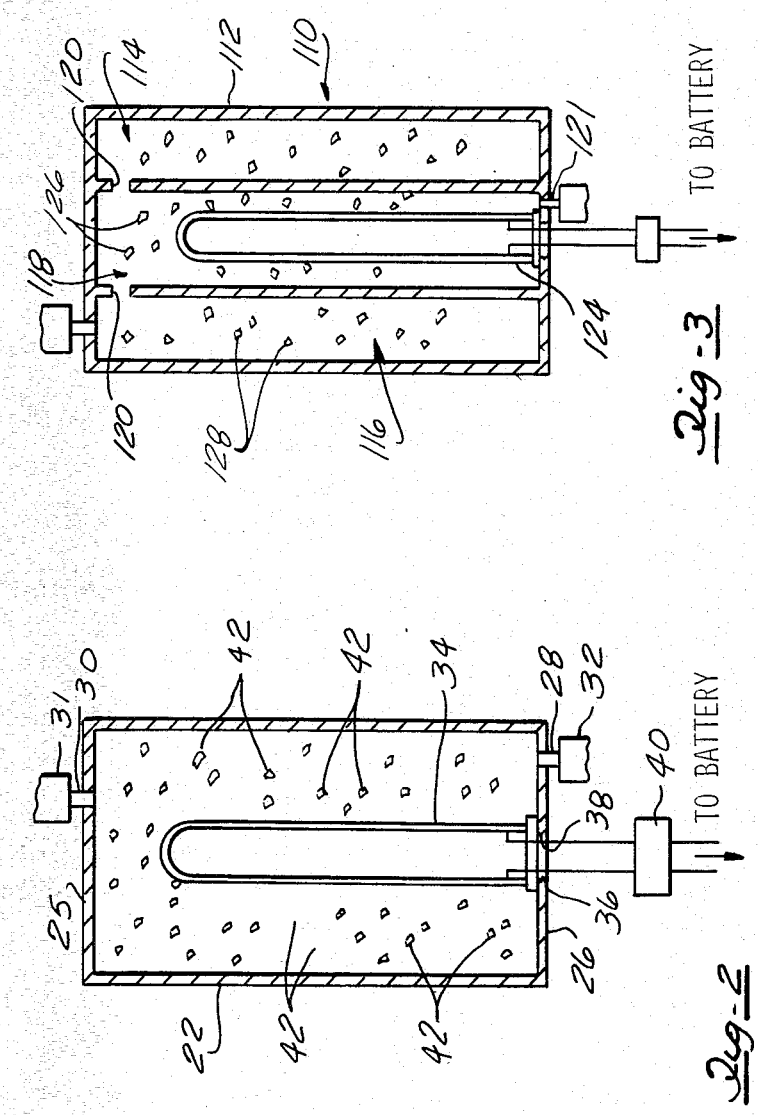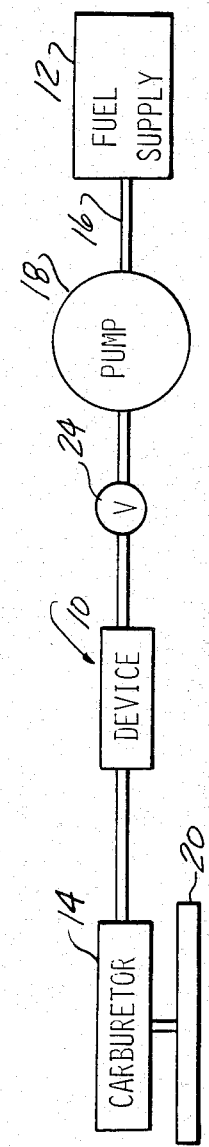

DEVICE FOR IMPROVING FUEL EFFICIENCY AND METHOD OF USE THEREFOR

BACKGROUND OF THE INVENTION

1. Field of the Invention

This invention relates, in general, to internal combustion engines and, more specifically, to fuel/air mixing systems for internal combustion engines.

2. Description of the Prior Art

Among the growing concerns of today's motorists are an adequate supply of fuel for vehicles and the rising costs thereof. Coupled with these concerns are the enhanced awareness of the ecological damage resulting from the emission of pollutants from fuel-burning, internal combustion engine powered, motor vehicles. In an internal combustion engine, the pollutants include oxides of nitrogen, carbon monoxide and unburned hydrocarbons. In addition to creating an ecological problem, the unburned hydrocarbons also contribute to inefficient engine of the engine. Further, in existing internal combustion engines, a measurable portion of the fuel supplied to the engine remains unburned and is discharged into the atmosphere. This not only pollutes the atmosphere, but it also results in uneconomical engine operation and poor engine performance.

Many attempts have been made to ensure a more complete combustion of the fuel in internal combustion engines. Many of these attempts have involved the utilization of a vaporizing apparatus to vaporize the fuel/air mixture before it is passed to the combustion chambers of the engine. It is also well known to provide suitable heating apparatus within the carburetor to heat the fuel/air mixture to a temperature more conductive to complete combustion prior to its entry into the combustion chambers. Such vaporizing and heating apparatus are typically mounted between the carburetor and the intake manifold of the engine so as to vaporize and/or heat the final fuel/air mixture passing therebetween.

Other attempts known in the prior art include the introduction of adjuvants to the fuel/air mixture prior to its introduction into the combustion chamber. However, such attempts at improving engine efficiency and performance by heating or vaporizing the fuel/air mixture prior to its entry into the combustion chambers have met with limited success at reducing engine pollutants.

Apart from the techniques used to improve engine performance by more completely burning the fuel/air mixture, additional pollutant control devices, such as the now prevalent catalytic converter, have come into use to reduce the amount of pollutants issuing from vehicle exhaust systems.

Such catalytic converters, while greatly reducing the amount of gaseous contaminants issuing from the vehicle exhaust systems, are quite costly and require modification of the vehicle for their installation. A large part of the cost is due to the quantity of platinum based materials used in their construction. Such converters also require specific types of fuel and, if wrong fuel is used, become clogged. This not only reduces their effectiveness in reducing air pollutants issuing from the vehicle but also severly impairs the engine performance.

Thus, the prior art has utilized separate devices to either improve engine performance or reduce pollutants issuing from the vehicle exhaust system. Such devices, while functioning satisfactorily to a certain extent in achieving the intended purpose, i.e., fuel efficiency improvement or pollutants reduction—then do little or nothing at reducing the engine concomitant for which they are not intended.

Thus, it would be desirable to provide a fuel/air mixing system for use with internal combustion engines which overcomes the problems with prior art devices in improving engine efficiency, i.e., decreasing the amount of fuel utilized per distance driven, as well as reducing the quantity of air pollutants issuing from the vehicle exhaust system. It would also be desirable to provide a fuel/air mixing system which is constructed as a single device and which functions to both improve engine performance and reduce pollutant levels. It would also be desirable to provide a fuel/air mixing system which can be easily incorporated in existing internal combustion engine designs without extensive modification thereof. Finally, it would be desirable to provide a fuel/air mixing system which is economical in cost.

SUMMARY OF THE INVENTION

There is disclosed herein a device for increasing the fuel efficiency of an internal combustion engine and a method of use therefor. The device is interposed a fuel supply and a combustion chamber. In gasoline engines, the device is interposed a fuel supply and a carburetor. The device includes a hollow housing disposed in fluid communication with the fuel supply conduit intermediate the fuel supply and the combustion chamber.

Disposed within the housing are a plurality of metallized pellets. The pellets, generally, comprise a noble metal deposited on an inert substance and are used to activate or "catalyze" the fuel passing through the housing.

Optionally, a heat source, such as a heating rod or element is disposed within the housing for elevating the temperature within the housing. Where used, the heating element is energized by the vehicle battery. A time-delay switch can, also, be incorporated into the system to regulate the temperature created by the heating element.

In an alternate embodiment hereof, the pellets disposed within the housing comprise two classes having different levels of metal deposited thereon. In this embodiment, the housing comprises at least two internal chambers in fluid communication. In one chamber is disposed a first class of pellets with the second class of pellets being disposed in the second chamber. The fuel passes through both chambers before being fed to the combustion chamber.

In practicing the present invention, the fuel enters the housing as a liquid and exits as a liquid therefrom. The temperature within the housing varies from ambient conditions to less than about 100° C.

The device of the present invention overcomes many of the problems of similar prior art devices in improving engine performance and efficiency; while, at the same time, significantly reducing the levels of pollutants issuing from the vehicle exhaust system. In addition, the pressure regulator of the present invention achieves both desired features in a single unit as compared to prior art attempts which maximized engine efficient or reduced pollution levels by use of separate devices installed on the vehicle. Furthermore, the device of the present invention is both economical in cost and easy to install on conventional internal combustion engines without requiring modifications thereto.

BRIEF DESCRIPTION OF THE DRAWINGS

The various features, advantages and other uses of the present invention will become more apparent by referring to the following detailed description and drawing in which:

FIG. 1 is a flow diagram showing the deployment of the device of the present invention.

FIG. 2 is a cross-sectional view of the device of the present invention;

FIG. 3 is a cross-sectional view of an alternate embodiment of the device of the present invention, and

DESCRIPTION OF THE PREFERRED EMBODIMENTS

Throughout the following description and drawing, identical reference numbers are used to refer to the same component shown in multiple figures of the drawing.

Referring now to the drawing, and to FIG. 1 in particular, there is illustrated a device generally indicated at 10, in accordance with the present invention.

Although the present invention will work with equal efficacy for both gasoline and diesel fuel engines, the present invention for purposes of clarity will be described with reference to a gasoline-burning internal combustion engine. Furthermore, the invention will work in connection with boats, motorcycles, etc. Again, however, for facility, the ensuing description will be made with reference to an automobile.

In a conventional vehicle, the fuel supply 12 is connected to the carburetor 14 of the engine via a fuel supply conduit, shown generally by reference number 16. A fuel pump 18 is disposed in fluid communication with the fuel supply conduit 16 to pump fuel from the fuel supply 12 to the carburetor 14.

As is conventionally known, the carburetor 14 functions to mix fuel and air in a proper ratio and to deliver the fuel/air mixture to the intake manifold 20 of the engine wherein the fuel/air mixture is transferred to the combustion chambers in the cylinders of the engine, not shown, and ignited to produce the explosive forces for driving the pistons of the engine which propel the vehicle.

According to the teachings of the present invention, the device 10 includes a housing 22 disposed in fluid flow communication with the fuel supply conduit 16 between the fuel supply 12 and the carburetor 14. Preferably, the device 10 is disposed in fuel supply conduit 16 between the fuel pump 18 and the carburetor 14. A check valve 24 is disposed between the fuel pump 18 and the device 10 to provide one way fuel flow therebetween.

The hollow housing 22 is of substantially cylindrical configuration, and is formed of a metallic material, such as steel or the like. The housing may be formed of any other material which is not reactive with the fuel. Likewise, the housing may be heat conductive or insulative, as required. The housing includes end or top and bottom wall members 25 and 26 respectively secured to opposed ends thereof to completely seal the interior of the housing 22. Inlet and outlet ports 28 and 30, respectively, are formed therein. The inlet port 28 is preferably formed in the side wall or bottom wall of the housing 22. A segment 32 of the fuel supply conduit 16 is secured to the port in fluid tight sealing relationship. The outlet port 30 is preferably formed in the end wall member 25. Another segment 31 of the fuel supply conduit 16 is secured to the outlet port, as shown.

It is contemplated in the practice of the present that the interior of the housing be heated. The heating can be achieved either from the ambient, i.e., the engine compartment or the atmosphere or from a heating element incorporated into the device. The heat source maintains the interior of the housing at a temperature ranging from about the ambient to a temperature of less than 100° C. Preferably, the temperature in the housing is maintained at a temperature of from about 25° C. to about 90° C. Hence in cold climates, and without a heat source incorporated within the device, the housing is heat conductive. Likewise, in extreme heat, the housing should demonstrate some insulative properties.

Preferably, however, the heat source is incorporated into the device. Where used, the internal heat source comprises a heating element 34.

The heating element 34 is securely mounted within the housing 22. Preferably, the heating element is in the form of a high watt density heater having an incoloy sheath material disposed about the exterior thereof.

The heating element 34 is mounted to the housing 22 by any suitably means, such as external threads 36 formed adjacent the first end of the heating element 34 which threadingly engage an opening 38 formed in the housing 22. In this manner, the heating element 34 may be inserted and secured within the housing 22 as well as removed for repair or replacement. As shown in FIG. 2, a pair of electrical connections or wires extend outward from the heating element 34 and are adapted to be connected to a suitable power source, such as the automobile battery (not shown), or the like, for providing electrical current to the heating element 34.

A suitable temperature sensing means (not shown) may be mounted in the housing 12 for controlling the temperature generated by the heating element. Suitable electrical connecting means, not shown, extend from the sensing unit to a conventional temperature control means so as to control the connection of electrical current to the heating element 34 to thereby maintain the temperature of the heating element 34 within the desired temperature range.

Likewise, because of the energy required by the heating element is quite high, a time-delay 40 is interposed the heating element and the battery. The time-delay 40 is a conventional relay switch which interrupts power flow to the heating element when the engine of the vehicle started.

As shown in the drawing, disposed within the housing are a plurality of pellets 42.

The pellets 42 generally comprise a metallized pellet of a metal deposited on an inert support or substrate. The metal deposition techniques for making such pellets are well known and do not form part of the present invention.

The metals which are employed herein include for example, noble metals, carbides and the like, as well mixtures thereof. Representative noble metals include platinum, nickel, palladium, rhenium, ruthenium, and the like. Useful carbides include titanium carbide, tungsten carbide, as well as mixtures thereof. Preferably, the metal is a noble metal and, in particular, platinum.

The inert or non-fuel reactive support or substrate are those conventionally deployed, such as silica, alumina, clays and the like. Preferably, the support of substrate is alumina.

The pellets 42 ordinarily have a mesh size ranging from about 1/32" in diameter to about ⅛" in diameter, and are tightly compacted within the housing.

In deploying alumina-supported platinum pellets, the purity of the platinum will range from about 0.1% to about 10%, in accordance with general manufacturing techniques. Preferably, the purity or concentration of platinum will range from about 0.1% to about 1.0%.

In practicing the present invention, liquid fuel is pumped into the housing 22 through which it passes. Within the housing, the fuel contacts the pellets and issues from the housing as a liquid. Although not wishing to be bound by any theory, it would appear that at the temperatures employed that some metal is solubilized and entrained into the fuel flow. The presence of the noble metal within the hydrocarbon fuel effectively increases the total combustion thereof. Hence the fuel efficiency of the internal combustion engine is improved.

It should, also, be noted with respect hereto, that as the fuel contacts the metallized pellets or "bubbling" effect occurs, wherein gases appear to be liberated from the fuel. These gases remain in the fuel and are released at the carburetor.

Referring now to FIG. 3 there is shown therein an alternate embodiment of the present device, generally, indicated at 110. The device 110 includes a housing 112 fabricated similarly to the housing 12. The housing 112 has a hollow interior and is substantially cylindrical in nature. A member 114 is disposed within the housing 112 and as concentric therewith. The housing 112 and member 114 cooperate to divide the device 110 into two chambers 116, 118, respectively, interiorly thereof. The member 114 has ports 120 formed therein which provide fluid communication between the chambers.

A fuel inlet 121 opens into the inner chamber 118 and a fuel outlet 112 communicates with chamber 116 to permit fuel to exit therefrom. A heating element 124, where used, is disposed within the interior chamber, as shown.

In accordance with this embodiment of the present invention, each chamber is packed with metallized pellets 126, 128, respectively. However, the metal concentration of the pellets within chamber 118 is higher than the metal concentration of the pellets in the chamber 116. The metal concentration of the metal pellets in the chamber 118 is about twice that of the pellets in the outer chamber 116. For example, assuming alumina-supported platinum pellets are employed, pellets containing about 0.6% platinum are disposed in the exterior chamber and pellets having a platinum concentration of about 0.3% are disposed in the outer chamber 116.

The present invention further contemplates a switching device 130 for contracting the heating element 124. The switching device 124 is in electrical communication with the wires extending from the heating element to the power source. The switching device is a multi-positioned switch for varying the electrical load to the element over a range from "off" to full energy flow. The switch is manually operable and conveniently located, such as on the dashboard of an automobile.

Having, thus, described the invention, what is claimed is:

1. A device for increasing the fuel effiency of an internal combustion engine and having a fuel supply conduit for conducting fuel from a fuel supply to a combustion chamber comprising:
   a housing having inlet and outlet ports, said housing disposed in fluid flow communication with said fuel supply conduit between said fuel supply and said combustion chamber;
   a heat source for maintaining the temperature within the housing at a temperature ranging from about the ambient to about less than 100° C.
   a plurality of metallized pellets disposed within the housing; and
   wherein fuel entering said housing through said inlet port contacts the pellets to dissolve some metal therewithin, and further wherein the fuel enters the housing as a liquid and exits the housing as a liquid.

2. The device of claim 1 which further comprises:
   a heating element removably mounted within the housing, the heating element maintaining the temperature within the housing within the specified range, the heating element defining the heat source.

3. The pressure regulator of claim 2 further including:
   temperature sensing means disposed within said housing for sensing the temperature of the heating element; and
   temperature control means, responsive to said temperature sensing means, for maintaining the temperature of said heating element within a predetermined range.

4. The device of claim 1 wherein the metallized pellets comprise a metal deposited on a non-fuel reactive substrate, the metal being selected from the group consisting of a noble metal or mixtures thereof.

5. The device of claim 4 wherein the metal is present in a concentration ranging from about 0.1% to about 10%, by weight, based on the total weight of the pellet.

6. The device of claim 4 wherein the agent and platinum on alumina material.

7. The device of claim 1 which further comprises:
   a hollow member disposed within the housing and being concentric therewith, the interior of the member defining a first chamber, the outer wall of the member cooperating with the housing to define a second chamber within the housing, the member having at least one opening formed therein to permit fuel flow therethrough, into the second chamber,
   each chamber having metallized pellets disposed therein,
   the inlet port opening into the first chamber defined by the interior of the hollow member, and
   the outlet port being in fluid communication with the second chamber which is defined between the housing and the hollow member.

8. The device of claim 7 which further comprises:
   a heating element removably mounted within the first chamber, the heating element maintaining the temperature in the housing within the specified range, the heating element defining the heat source.

9. The device of claim 7 wherein the metallized pellets comprise a metal deposited on a non-fuel reactive substrate, the metal being selected from the group consisting of a noble metal, titanium carbide, tungsten carbide and mixtures thereof.

10. The device of claim 9 wherein the metal is present in a concentration ranging from about 0.1% to about 10%, by weight, based on the total weight of the pellets, the pellets in the first chamber having a higher metal concentration than the pellets in the second chamber.

* * * * *